Sept. 23, 1969   W. R. ATTWOOD ET AL   3,468,567
FASTENING CLAMP
Filed Oct. 27, 1967
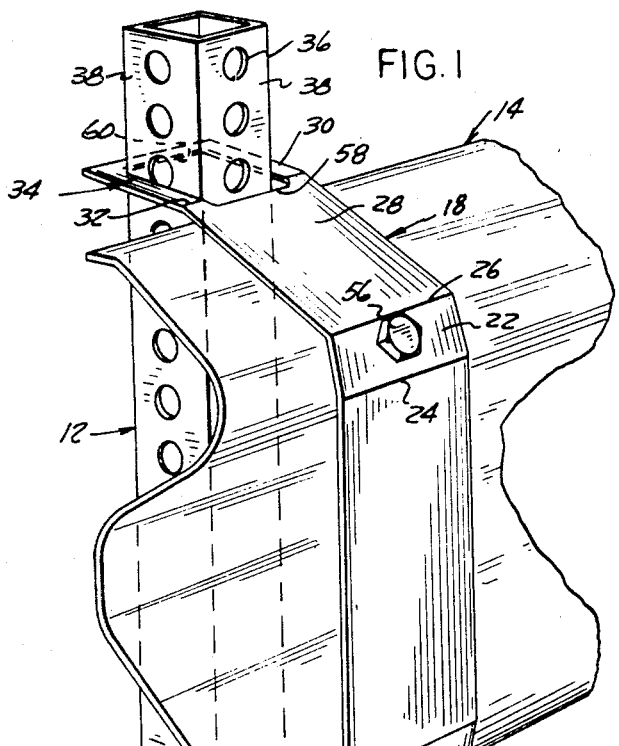
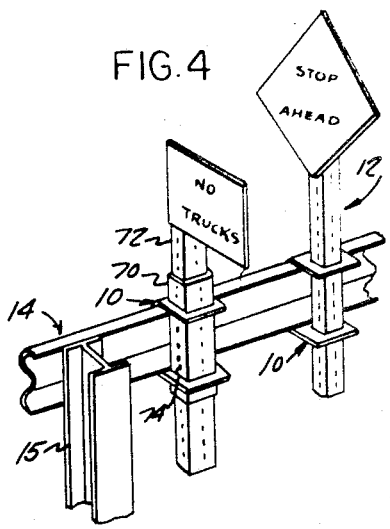
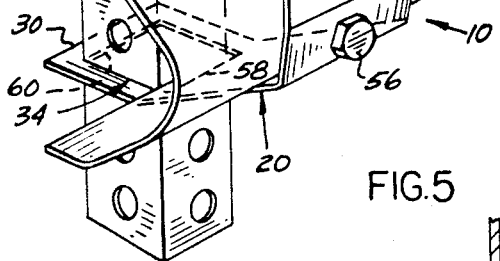
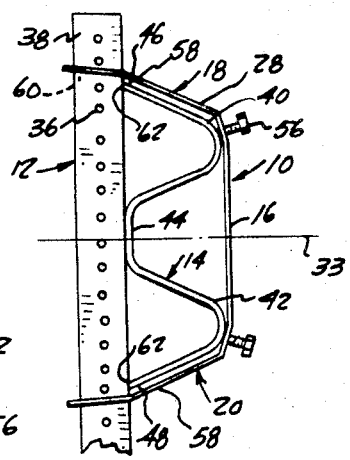
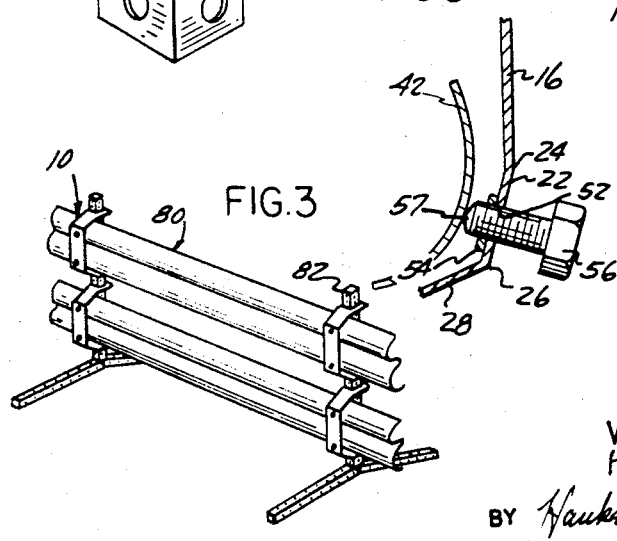
INVENTOR
WARREN R. ATTWOOD
HERBERT J. HENRY
BY *Hauke, Krass, & Gifford*
ATTORNEYS

United States Patent Office 3,468,567
Patented Sept. 23, 1969

3,468,567
FASTENING CLAMP
Warren R. Attwood, Wayne, and Herbert J. Henry, Dearborn Heights, Mich., assignors to Unistrut Corporation, Wayne, Mich., a corporation of Michigan
Filed Oct. 27, 1967, Ser. No. 678,692
Int. Cl. F16b 7/00; F16d 3/08; E04b 1/38
U.S. Cl. 287—51                                    4 Claims

ABSTRACT OF THE DISCLOSURE

A clamp used with a metal framing system for adjustably supporting an upright member on a structural member. The clamp is of the type having a generally C-shaped configuration and being formed with registering apertures therein for the reception of the upright member therethrough to be retained by pressure exerting means.

BACKGROUND OF THE INVENTION

Field of the invention

This invention relates to fastening clamps and more particularly to an adjustable and demountable fastening clamp for use with metal framing systems.

Description of the prior art

In the deployment of highway traffic signs of either a temporary or permanent character it has been the practice to use conventional metal post members requiring the driving thereof into the ground or wooden posts requiring hole drilling equipment to effect the desired location of these signs. Further to the maintaining of highways in a safe condition there is a need for a variety of traffic control devices such as temporary barricades, shade screening supports for auto headlight beams, and snow poles to mention only a few.

With the increased use of guard rails, such as the ones in common use formed of heavy gauge galvanized iron and having a generally W-shape in cross section, it has been recognized that if the aforementioned highway signs and devices could be mounted in cooperation with these guard rail structures there would be a great saving in both man hours and material. While various means have been used to secure uprights such as sign posts and the like in combination with barrier structures, they usually necessitate drilling holes or slots in the barrier. This not only requires more time and equipment, but does not allow for re-positioning the signs or other devices. Also, the placement of holes in the barrier can result in the initiation of rust areas, while reducing the structural integrity of the barrier or other structural member.

SUMMARY OF THE INVENTION

The present invention provides a single piece fastening device having a generally C-shaped profile that is designed to cooperate with a first structural member such as, for example, the standard type highway barrier having a generally W-shaped cross section to adjustably support a second structural member. The fastening device has a body portion having a pair of interconnected arms with free extremities remote from their junction. Each arm comprises a portion inclined outwardly from the body while the free portions, having aligned apertures therein, extend past the first member to receive the second member in aligned apertures. Fastening means, such as pressure bolts, are located at each end of the body so as to retain the adjustable member, extending through the apertures, in fixed relation to the first member.

An object of the present invention is to provide a fastening device which cooperates with a structural member to allow for adjustable fastening of another structural member thereto.

Another object of the present invention is the provision of clamp means which, in combination with a corrugated highway barrier, will allow for quick assembly of an upright structural member thereto.

A further object of the invention is the provision of a fastening device which allows for the securing together of two structural members at substantially right angles thereto so that one of said members can be readily adjustable vertically and horizontally in relation to the other structural member.

Other objects and advantages of the invention will hereinafter become more fully apparent from the following description of the annexed drawings, which illustrate a preferred embodiment.

BRIEF DESCRIPTION OF THE DRAWINGS

FIG. 1 is a perspective view of the fastening clamp in use in supporting a structural member to a barrier structure.

FIG. 2 is a vertical side elevational view of the upright post, and clamp of FIG. 1 illustrating the mode of attachment of the upright to the barrier.

FIG. 3 is a perspective view showing the employment of applicant's fastening clamp to support individual sections of barrier members for use in temporary barricades, and FIG. 4 is a view showing yet another means of employing applicant's clamp.

FIG. 5 is an enlarged sectional view of the apex area of the lower corrugation and the adjacent portion of the clamp.

DESCRIPTION OF THE PREFERRED EMBODIMENT

Referring now to the drawings, there is shown in FIG. 1 a perspective ciew of the fastening clamp 10 in use in supporting a vertical upright member 12 to a horizontal structural member such as a highway barrier, indicated generally at 14. The barrier 14 is in turn supported by being fastened to posts 15 (FIG. 4) by suitable means such as bolts. The means for supporting the permanent barrier 14 forms no part of the instant embodiment and it is within the purview of the disclosure that the members 14 could be used in various ways such as continuous barriers or individual lengths as shown in FIG. 3, for example, without departing from the scope of the present invention.

It is contemplated that the fastening device 10 be made from a single piece of gauge strip material preferably that of spring-like nature, such as spring steel or cold rolled metal having spring-like characteristics. The strip of material is formed to provide a substantially planar or flat body 16 having a pair of interconnected arms generally indicated at 18 and 20. Each arm comprises a first planar elbow portion 22 inclined at an angle with the base or body 16 by being bent along bend line 24. In the instant embodiment, the portion 22 forms an angle of approximately 25° with the body 16. The elbow 22 in turn is joined by means of bend line 26 to provide a yieldable intermediate portion 28 which projects outwardly at an angle of inclination from the general plane of elbow 22 which in the instant case is shown at 45°. Each arm portion 18 and 20 has free flange portions 30, defined by bend lines 32, at the outer extremities of intermediate portions 28 so as to diverge outwardly from the axis of symmetry 33 of the clamp 10. Each flange portion 30 is formed with registering apertures or openings 34. The aligned apertures 34 in the present embodiment have a general polygonal configuration which may be rectangular as is shown for the reception of a rectangular upright member 12.

In the instant case the upright member 12 is shown in the form of a tubular structural member having a plurality of equally longitudinally spaced perforations 36 provided in each of the flat sides 38. Structural members of this general type are shown in U.S. Patent No. 3,284,941, issued Nov. 15, 1966 and U.S. Patent No. 3,295,873, issued Jan. 3, 1967.

Applicants, of course, do not intend to limit the instant application to any particular type of upright structure and the perforated structural member 12 is disclosed only for purposes of showing one possible post member to be supported by the fastening device 10.

As best shown in FIG. 2, the barrier structure 14 consists of elongated metal elements, each of which is so configured as to form a deep longitudinal corrugation 40 at one edge and a similar deep longitudinal corrugation 42 at the other edge. Between these corrugations there is a flat area indicated at 44. The extreme edges of the barrier elements are shown turned inwardly as indicated at 46 and 48. The barrier elements are usually made from 10 gauge or 12 gauge metal, although other thicknesses may be used if desired. The barrier elements in their corrugated condition are about a foot wide.

As best seen in FIG. 5, each elbow portion 22 is provided with a hole 52 having a nut 54 welded or otherwise fixably secured on the underside thereof which threadably engages pressure bolts 56 for retaining the clamp member 10 and upright 12 as will be described in more detail hereinbelow. It should be noted that the axis of each bolt 56 is positioned normal to the plane of elbow 22 so that the extensions thereof converge at a common point on trace line 33.

In order to releasably retain the upright 12 in the desired position, it is inserted in the aligned openings 34 so as to extend therethrough after the clamp is located on the barrier 14 at the precise point desired. In the present form of the invention each opening 34 is substantially identical, being generally rectangular in shape with a width of two and one-sixteenth inch and a length of two and three-eighths inch which will accommodate uprights having a size within the range of one and three quarters inch square to two inches square. It will be further observed that the positioning of rectangular openings 34 is such that they extend into intermediate portion 28 thereby interrupting bend lines 32 to form paired hinged sections.

In operation, when the upright 12 is disposed at the desired horizontal and vertical position, the bolts 56 are tightened to cause their ends 57 to bear against member 14 so that the paired edges 60 and 62 are drawn against the upright 12 in offset opposed relation. It can be seen in FIG. 5 that each bolt 56 is positioned to contact the outer curved portions of corrugations 40 and 42, respectively, to place both the clamp body 16 and its adjacent arm portion in tension. By means of this complemental arrangement of the pressure bolts each bolt urges the upright in a direction to bear against the aligning edges 62 while also urging the clamp body 16 in opposed colinear directions to maintain the clamp in fixed symmetrical relation to the barrier member.

It will be understood that the bolt 56, instead of being of conventional design as shown, may have its end 57 roughened, serrated or pointed to firmly bite into the barrier 14 or other structural member being used.

FIG. 4 shows a modified form of the invention wherein the clamp 10 is used to retain a tubular member 70 in fixed position against the barrier 14. In this way an upright post member 72 can be telescoped within the tube 70 and secured by a through bolt indicated at 74 in a manner shown in the aforementioned Patent No. 3,284,-971, for example. In this way the post 72 can be readily inserted and removed or adjusted vertically by means of the series of cooperating perforations in the members 70 and 72.

Another feature of applicants' invention resides in the location and size of the aligned rectangular apertures 34 in relation to the overall clamp structure. Beside allowing the upright extending therethrough freedom of axial movement during positioning, the clamp is able to retain uprights having a range of cross-sectional sizes. This is achieved by the aforementioned relationship of the oversize apertures with the bend lines 32, together with the adjustable pressure means supplied by the pair of bolts 56. The fact that the bend lines 32 are located outwardly of the transverse edges 58 provides for increased flexual movement of the arms 18 and 20 about said bend lines during the tightening of the bolts 56 thereby allowing the clamp to adjust to different sized uprights. In the instant embodiment, for example, applicants' clamp can be used with uprights having square sections in the range of one and three-fourths inches to two inches.

FIG. 3 shows another application of the clamp of the present invention wherein one or more barrier sections 80 can be retained on upright members 82 to form a temporary barricade. It will be observed that when used in this manner, the upright 82 becomes the fixed member and the barrier sections 80 the adjustable members. However, the function of applicants' clamp in retaining the members 80 and 82 firmly in position in relation to each other remains the same as described above.

We claim:
1. A structural member of elongated form, having outer longitudinal corrugations and parallel longitudinal edges, in combination with a fastening device for securing together a transverse member and the structural member, said fastening device comprising:
   (a) a body having a pair of interconnected flexible arms with free extremities remote from their junction, said arms extending outwardly from the ends of said body to form a recess for receiving the structural member,
   (b) said extremities being formed with registering apertures having an inner edge portion and an outer edge portion and adapted to slidably receive therethrough a transverse member, and
   (c) pressure means located on said body adjacent each said arm junction for the complemental engagement of each said longitudinal corrugation for urging said inner edge and said outer edge portions in opposite directions along said transverse member and said inner edge portions of said apertures and said parallel longitudinal edges in a direction toward one another to thus clamp said transverse member between said inner and said outer edge portions of said extremities and between said outer edge portion and said longitudinal edge and against said structural member.

2. The combination of claim 1 wherein each said pressure means is adapted to engage said structural member adjacent to and outwardly from the apex portion of its associated longitudinal corrugation to thereby urge said extremities toward each other.

3. The combination of claim 2 wherein:
   (a) a pair of bend lines being at each said junction providing an elbow formed out of the planes of said adjoining body and arm, and
   (b) said pressure means extending from each elbow so that the pressure on said corrugation is directed on a line inclined toward the axis of symmetry of said device.

4. An adjustable clamp assembly for mounting an upright on a structural member, said device comprising:
   (a) a clamp having a body portion and a pair of interconnected arms with free extremities remote from their junction, said arms extending angularly outwardly from the ends of said body to form a recess for receiving the structural member,
   (b) said extremities having aligned apertures slidably receiving therethrough a tubular sleeve having therein a plurality of pairs of diametrically opposed longitudinally spaced perforations,
(c) an elongated upright having one end thereof slidably located in said sleeve having means selectively engageable in a pair of the perforations, and
(d) opposite pressure means located on said body adjacent each said arm junction for exerting pressure between said clamp and said structural member in a direction of convergency whereby said sleeve is retained on said structural member.

References Cited

UNITED STATES PATENTS

| | | | |
|---|---|---|---|
| 809,549 | 1/1906 | Beyerle. | |
| 1,559,187 | 10/1925 | Sexton | 287—51 |
| 2,056,842 | 10/1936 | Edgecomb | 256—13.1 |
| 2,208,358 | 7/1940 | Chandler | 287—49 X |
| 2,776,116 | 1/1957 | Brickman | 256—13.1 |
| 2,858,266 | 10/1958 | Schneider | 287—49 X |
| 2,915,879 | 12/1959 | Besse | 256—13.1 X |
| 3,276,750 | 10/1966 | DeRidder | 256—13.1 |
| 3,325,227 | 6/1967 | Hunter | 287—51 X |

FOREIGN PATENTS 775,566   5/1957   Great Britain.

DENNIS L. TAYLOR, Primary Examiner

U.S. Cl. X.R.

256—13.1, 64